ns Patent Office 3,209,020
Patented Sept. 28, 1965

3,209,020
THIOPHOSPHONIC ACID ESTERS CONTAINING AT LEAST ONE S-ALKYL GROUP
Gerhard Schrader, Wuppertal - Cronenberg, Germany, assignor to Farbenfabriken Bayer Aktiengesellschaft, Leverkusen, Germany, a corporation of Germany
No Drawing. Filed Sept. 29, 1961, Ser. No. 141,587
Claims priority, application Germany, Oct. 5, 1960, F 32,273; Dec. 1, 1960, F 32,669
15 Claims. (Cl. 260—461)

The present invention relates to and has as its objects new and useful phosphonous derivatives with pesticidal properties and processes for the production thereof. The new compounds of this invention may be represented by the following general formula

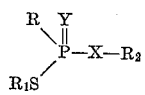

In this formula R stands for aliphatic or aromatic radicals, $R_1$ stands for aliphatic radicals, and X and Y stand for oxygen or sulfur and $R_2$ stands for optionally substituted aliphatic, cycloaliphatic or aromatic radicals.

Phosphonous acid-S-alkyl ester halides have not been described in the literature until now.

These highly reactive compounds can be produced by reacting alkyl-phosphonous acid dichlorides in suitable solvents with the equivalent amount of an optional mercaptan in the presence of an acid-binding agent.

In accordance with the present invention it has now been found that phosphonous acid-S-alkyl ester halides can be reacted with optional alcohols, phenols, aliphatic or aromatic mercaptans in the presence of a suitable acid-binding agent whereupon the hitherto unknown phosphonous acid-O.S-dialkyl esters or phosphonous acid-S.S-dialkyl esters are formed. By the addition of sulfur or oxygen to these compounds the corresponding (thiono-)-phosphonic acid-O.S-diesters or the likewise new (thiono-)-phosphonic acid-S.S-diesters can be obtained from the said trivalent phosphorus compounds.

This reaction according to the present invention may be explained in more detail with the aid of the following sequence of reactions:

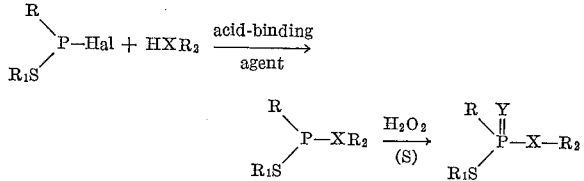

In these formulae the symbols have the same significance as given above.

By way of example of phosphonous acid-S-alkyl ester halides which can be employed according to the invention mention may be made of the methyl-, ethyl, propyl, butyl-, hexyl-, phenyl-, 4-chlorophenyl-, or 4-methoxyphenyl-phosphonous acid-methyl, ethyl, propyl ester chlorides or bromides.

Moreover, practically all alcohols, phenols, or mercaptans are suitable for reaction according to the process. By way of alcohols, use can be made, e.g., of hexanol, cyclohexanol, octyl alcohol, dodecyl alcohol the corresponding mercaptans as well as of lower aliphatic alcohols or mercaptans which may optionally be substituted by halogen atoms, cyano, amino, and alkyl- or di-alkyl-amino, hydroxy, alkoxy, carbalkoxy, alkylmercapto groups and the like. As phenols or thiophenols, consideration can be given to, inter alia, (thio)-phenol, (thio)-cresol, chloro-(thio)-phenols, di- and tri-chloro-(thio)-phenols, nitro-(thio)-phenols, alkyl-(thio)-phenols, alkyl-chloro-(thio)-phenols, alkoxy- or alkyl-mercapto-(thio)-phenols, or alkoxy- or alkylmercaptoalkyl-(thio)-phenols, for use as starting materials in the process according to the invention.

It has already been mentioned that the reaction of the phosphonous acid-S-alkyl ester halides with the corresponding alcohols, phenols, or mercaptans is suitably carried out in the presence of acid-binding agents. Among these, tertiary bases such as, e.g., pyridine, triethylamine, or dimethylaniline, have been found to be particularly useful.

To avoid interference by side reactions it is further an advantage if the formation of the phosphonous acid-O.S- or -S.S-diesters is carried out in an atmosphere of a protective gas (passage of an inert gas, e.g. nitrogen, through the reaction mixture).

In addition, the reaction according to the invention is suitably carried out in a solvent and also at a slightly elevated temperature, in order that good yields may be achieved and particularly pure products of the process may be obtained. Consideration may be given to, e.g., hydrocarbons such as benzene or toluene as suitable solvents.

For carrying out the reaction according to the invention it is not necessary to isolate the phosphonous acid-O.S- or -S.S-dialkyl- or -alkyl- or -cycloalkyl- or -alkylaryl-esters produced in the first stage of reaction. Instead, these intermediate products can be oxidized at once with hydrogen peroxide as a single operation to give the corresponding phosphonic acid-O.S- or -S.S-di-esters. Surprisingly, no oxidation of the thio-sulfur occurs during this process. This behaviour of the otherwise very labile and hence extremely reactive derivatives of trivalent phosphorus could not have been foreseen in any way.

It is also not necessary to isolate the labile trivalent phosphorus intermediates in case of the addition of sulfur. Addition proceeds here in an exothermic reaction. The resultant 5-valent thiono-compounds are stable so that they can be obtained in the pure form by distillation or crystallization.

The thiophosphonic acid esters obtainable according to the invention usually represent oils which can, in part, be distilled in vacuum without decomposition. The compounds obtainable according to the present invention are characterized by excellent insecticidal properties. They are therefore intended for use as pest control agents, particularly for plant protection. The application of the products from the process for the specified purpose is effected by the method normally employed with pest control agents or plant protection agents based on phosphoric esters, i.e. preferably in combination with solid or liquid extenders or diluents.

As examples for the special utility the compounds of the following formulae

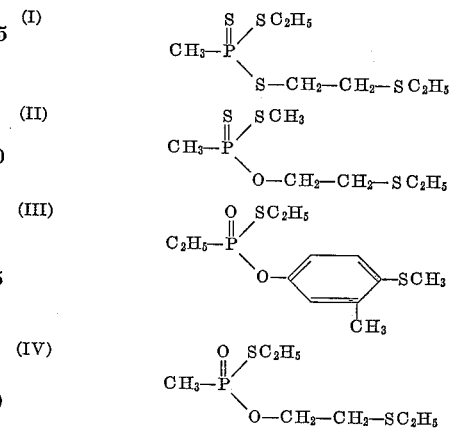

have been tested against aphids and spider mites.

Aqueous dilutions of these compounds have been prepared by admixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentration as indicated in the following paragraphs. The tests have been carried out as follows:

(a) Against aphids (contact-insecticidal action) of the type *Doralis fabae*. Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound | Aqueous concentration (in percent active ingredient/water) | Killing rate (in percent) |
| --- | --- | --- |
| (I) | 0.004 | 100 |
| (II) | 0.0008 | 90 |
| (III) | 0.01 | 100 |
| (IV) | 0.004 | 90 |

(b) Against spider mites (contact-insecticidal action). Bean plants (*Phaseolus vulgaris*) of about 15 inches height are sprayed drip wet with solutions as indicated above. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
| --- | --- | --- |
| (I) | 0.004 | 100 |
| (II) | 0.0008 | 90 |
| (III) | 0.01 | 100 |
| (IV) | 0.004 | 90 |

The following examples without intent of restriction provide a survey over the invention as described before in more general terms.

*Example 1*

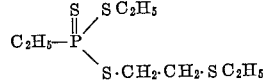

61 g. (0.5 mol) of β-ethylmercapto-ethyl mercaptan (B.P. 67° C./12 mm. Hg) are dissolved with 50 g. of pyridine in 400 cc. of toluene. 79 g. of ethyl-phosphonous acid-S-ethyl ester chloride (B.P. 50° C./3 mm. Hg) are added dropwise while stirring and simultaneously passing through nitrogen. The mixture is stirred at 30° C. for an hour and 16 g. of finely powdered sulphur are then added in one portion. The reaction product is kept at 90° C. for an hour while stirring is continued. The reaction product is then allowed to cool to room temperature and poured into 500 cc. of ice-water. The precipitated oil is separated off, washed with dilute hydrochloric acid and subsequently de-acidified with a 3% sodium bicarbonate solution. Upon fractionating, 88 g. of ethyl-thionophosphonic acid-S-ethyl-S-(β-ethylmercaptoethyl) ester of B.P. 94° C./0.01 mm. Hg are obtained. Yield 64% of the theoretical. The new ester is a water-insoluble colorless oil.

*Example 2*

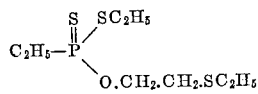

53 g. (0.5 mol) of β-ethylmercapto-ethanol are dissolved in 400 cc. of benzene. 50 g. of anhydrous pyridine are added to this solution and 79 g. of ethyl-phosphonous acid-S-ethyl ester chloride are then added dropwise while stirring in a nitrogen stream. The mixture is stirred at 60° C. for an hour and 16 g. of finely powdered sulphur are then added. The reaction product is then heated to 80° C. for a further hour, cooled to room temperature and poured into 400 cc. of ice-water and dried over sodium sulphate. Upon fractionating, 109 g. of ethyl-thionophosphonic acid-S-ethyl-O-(β-ethylmercaptoethyl) ester of B. P. 86° C./0.01 mm. Hg are obtained. Yield 85% of the theoretical.

*Example 3*

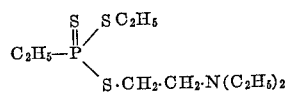

68 g. (0.5 mol) of β-diethylamino-ethyl-mercaptan (B.P. 52° C./12 mm. Hg) are dissolved in 400 cc. of benzene. 79 g. of ethyl-phosphonous acid-S-ethyl ester chloride are added thereto with stirring and passing through of nitrogen. The mixture is heated to 40° C. for an hour and 16 g. of finely powdered sulphur are then added. The reaction product is kept at 80° C. for an hour. It is then cooled to room temperature and 20 g. of caustic soda, dissolved in 50 cc. of water, are added at 0° C. The benzene layer is then separated off and dried over sodium sulphate. Upon fractionating, 82 g. of ethyl-thionophosphonic acid-S-(β-diethylaminoethyl)-ester of B.P. 97° C./0.01 mm. Hg are obtained. Yield 58% of the theoretical.

*Example 4*

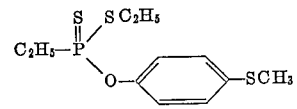

70 g. (0.5 mol) of 4-methylmercaptophenol are dissolved in 400 cc. of toluene. 50 g. of anhydrous pyridine are added thereto and 79 g. of ethyl-phosphonous acid-S-ethyl ester chloride are then added dropwise with stirring and passing through of nitrogen. The mixture is kept at 40° C. for an hour. 16 g. of finely powdered sulphur are then added and the reaction product is kept at 90° C. for a further hour. The reaction product is then cooled to room temperature and poured into 400 cc. of ice-water. The toluene layer is separated off, washed with water and dried over sodium sulphate. Upon fractionating, 105 g. of ethyl-thionophosphonic acid-S-ethyl-O-(4-methylmercaptophenyl) ester of B.P. 110° C./0.01 mm. Hg are obtained. Yield 72% of the theoretical.

*Example 5*

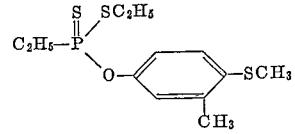

77 g. (0.5 mol) of 4-methylmercapto-3-methylphenol are dissolved in 400 c. of toluene. 50 g. of anhydrous pyridine are added to this solution and 79 g. of ethyl-phosphonous acid-S-ethyl ester chloride are then added dropwise at 40° C. with stirring and passing through of nitrogen. The mixture is kept at 40° C. for a further hour. 16 g. of finely powdered sulphur are then added. The reaction product is kept for an hour at 90° C. and then worked up in usual manner. In this way 89 g. of ethyl-thionophosphonic acid-S-ethyl-O-(4-methylmercapto-3-methylphenyl)ester of B.P. 112° C./0.01 mm. Hg are obtained. Yield: 58% of the theoretical.

Example 6

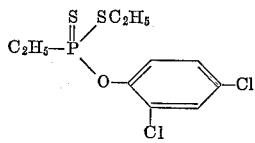

81 g. (0.5 mol) of 2,4-dichlorophenol are dissolved in 400 cc. of toluene. 50 g. of anhydrous pyridine are added with stirring in a nitrogen stream. 79 g. of ethyl-phosphonous acid-S-ethyl ester chloride are added dropwise with further stirring and the mixture is kept at 40° for an hour. Subsequently 16 g. of finely powdered sulphur are added and the reaction product is kept at 90° C. for an hour. After working up in usual manner, 117 g. of ethyl-thionophosphonic acid-S-ethyl-O-(2,4-dichlorophenyl) ester are obtained as a water-insoluble colorless oil. Yield 74% of the theoretical.

Example 7

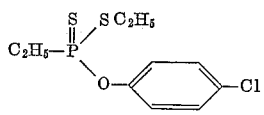

64 g. (0.5 mol) of 4-chlorophenol are dissolved in 400 cc. of toluene and 50 g. of pyridine. 79 g. of ethyl-phosphonous acid-S-ethyl ester chloride are added at 40° C while passing through nitrogen and the mixture is heated at 40° C. for an hour. 16 g. of finely powdered sulphur are then added to the reaction product which is kept at 90° C. for an hour. By working up in usual manner, 97 g. of ethyl-thionophosphonic acid-S-ethyl-O-(4-chlorophenyl) ester of B.P. 104° C./0.01 mm. Hg are obtained. Yield 69% of the theoretical.

Example 8

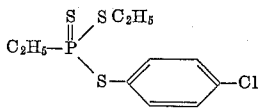

72 g. (0.5 mol) of p-chlorophenyl mercaptan are dissolved in 400 cc. of benzene. 50 g. of anhydrous pyridine are added to this solution. 79 g. of ethyl-phosphonous acid-S-ethyl ester chloride are then added dropwise at 30–40° C. while passing through nitrogen. The mixture is stirred at 40° C. for an hour and 16 g. of finely powdered sulphur are then added. The reaction product is kept at 80° C. for an hour and then worked up in usual manner. 119 g. of ethyl-thionophosphonic acid-S-ethyl-S-(p-chlorophenyl)ester are thus obtained as a water-insoluble colorless oil. Yield 80% of the theoretical.

Example 9

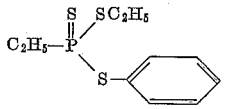

55 g. (0.5 mol) of thiophenol are dissolved in 400 c. of benzene. 50 g. of pyridine are added to this solution and 79 g. of ethyl-phosphonous acid-S-ethyl ester chloride are then added dropwise at 35° C. while passing through nitrogen. The mixture is kept at 30–35° C. for an hour and 16 g. of finely powdered sulphur are then added. The reaction product is kept at 80° C. for an hour and then worked up in usual manner. 120 g. of ethyl-thionophosphonic acid-S-ethyl-S-phenyl ester are thus obtained as a colorless water-insoluble oil. Yield 92% of the theoretical.

Example 10

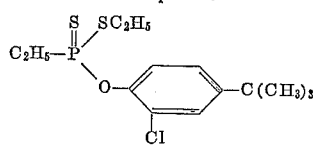

To a solution of 92 g. (0.5 mol) of 2-chloro-4-tert. butylphenol in 400 cc. of benzene are added 50 g. of pyridine and subsequently 79 g. of ethyl-phosphonous acid-S-ethyl ester chloride are added dropwise to the reaction mixture at 30° C. with stirring and passing through of nitrogen. In order to complete the reaction, the mixture is stirred at 40° C. for a further hour, then treated with 16 g. of finely powdered sulphur, heated to 80° C. for a further hour and, finally, worked up as described in Example 1. In this way, 133 g. (79% of the theoretical) of ethyl-thionophosphonic acid-S-ethyl-O-(2-chloro-4-tert.butyl-phenyl) ester are obtained in the form of a pale yellow water-insoluble oil.

Example 11

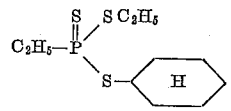

58 g. (0.5 mol) of cyclohexyl mercaptan are dissolved in a mixture of 400 cc. of benzene and 50 g. of anhydrous pyridine. To this solution there are added dropwise at 30–40° C. in a nitrogen stream 79 g. (0.5 mol) of ethyl-phosphonous acid-S-ethyl ester chloride, the mixture is subsequently heated with stirring to 40° C. for an hour and then treaed with 16 g. of sulphur. In order to complete the reaction, the reaction mixture is heated to 80° C. for a further hour and then worked up as described in Example 1. Yield: 112 g. (84% of the theoretical) of ethyl-thionophosphonic acid-S-ethyl-S-cyclohexyl ester of B.P. 85° C./0.01 mm. Hg.

Example 12

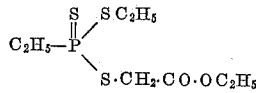

A mixture of 60 g. (0.5 mol) of thioglycollic acid ethyl ester, 400 c. of benzene and 50 g. of pyridine is treated at 30–40° C. while stirring with 79 g. (0.5 mol) of ethyl-phosphonous acid-S-ethyl ester chloride, the reaction mixture is stirred at 40° C. for an hour and 16 g. of finely powered sulphur are then added. The mixture is subsequently heated to 80° C. for an hour and then worked up as described in Example 1. 73 g. (54% of the theoretical) of ethyl-thionophosphonic acid-S-ethyl-S-ethoxycarbonyl methyl ester of B.P. 86° C./0.01 mm. Hg are thus obtained.

Example 13

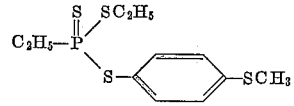

78 g. (0.5 mol) of 4-methyl-mercapto thiophenol (B.P. 52° C./0.01 mm. Hg) are dissolved in a mixture of 400 cc. of benzene and 50 g. of pyridine and 79 g. (0.5 mol) of ethyl-phosphonous acid-S-ethyl ester chloride are added dropwise at 30–40° C. while stirring and passing through nitrogen to reaction mixture which is stirred at 40° C. for an hour and then treated with 16 g. of finely powdered sulphur. In order to complete the reaction, the mixture is heated to 80° C. for an hour and then worked up as described in Example 1. 125 g. (82% of the theoretical) of ethyl-thionophosphonic acid-S-ethyl-S-(4-methylmercaptophenyl)ester are obtained in the form of a pale yellow water-insoluble oil.

Example 14

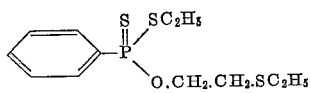

53 g. (0.5 mol) of β-ethylmercapto-ethanol are dissolved in 400 cc. of benzene with the addition of 50 g. of pyridine. In a nitrogen stream there are added dropwise to this solution at 40° C., 103 g. (0.5 mol) of phenyl-phosphonous acid-S-ethyl ester chloride (B.P. 92° C./1 mm. Hg), the mixture is heated at 40° C. for a further hour and then treated with 16 g. of powdered sulphur. The reaction mixture is subsequently heated to 90° C. for an hour and then worked up as described in Example 1. Yield: 135 g. (98% of the theoretical) of phenyl-thionophosphonic acid-S-ethyl-O-(β-ethyl-mercaptoethyl) ester. Yellow water-insoluble oil of B.P. 150° C./0.01 mm. Hg.

Example 15

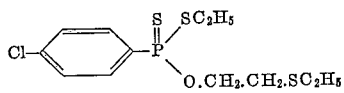

A mixture of 53 g. (0.5 mol) of β-ethylmercapto-ethanol, 400 cc. of benzene and 50 g. of pyridine is treated at 40–50° C. in a nitrogen stream with 120 g. (0.5 mol) of 4-chlorophenyl-phosphonous acid-S-ethyl ester chloride (B.P. 122° C./1 mm. Hg), the reaction mixture is further heated at 40° C. for an hour and 16 g. of powdered sulphur are then added to the mixture which is subsequently heated to 90° C. for an hour and then worked up as described in Example 1. 135 g. (87% of the theoretical) of 4-chlorophenyl-thionophosphonic acid-S-ethyl-O-(β-ethylmercapto-ethyl) ester are thus obtained in the form of a yellow water-insoluble oil.

Example 16

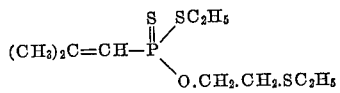

To a mixture of 27 g. (0.25 mol) of β-ethylmercapto-ethanol in 300 cc. of toluene and 25 g. of pyridine are added dropwise with stirring and passing through of nitrogen 46 g. (0.25 mol) of isobutenyl-phosphonous acid-S-ethyl ester chloride (B.P. 76° C./1 mm. Hg), the reaction mixture is subsequently heated at 45° C. for an hour, then treated with 8 g. of powdered sulphur and further heated to 90° C. for an hour. After working up as described in Example 1, 60 g. (95% of the theoretical) of isobutenyl-thionophosphonic acid - S - ethyl-O-(β-ethyl-mercapto-ethyl) ester are obtained in the form of a water-insoluble oil of B.P. 122° C./0.01 mm. Hg.

Example 17

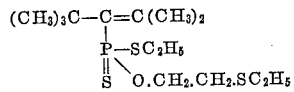

27 g. (0.25 mol) of β-ethylmercaptoethanol are dissolved in a mixture of 300 cc. of toluene and 25 g. of pyridine. The resultant solution is treated at 40–50° C. in a nitrogen stream with 60 g. (0.25 mol) of isooctenyl-phosphonous acid-S-ethyl ester chloride (B.P. 96° C./1 mm. Hg), then heated at 50° C. for a further hour and 8 g. of powdered sulphur are then added. The reaction mixture is subsequently heated to 90° C. for an hour and worked up as described in Example 1. 75 g. (97% of the theoretical) of isooctenyl-thionophosphonic acid-S-ethyl-O-(β-ethylmercapto-ethyl) ester are thus obtained. The product is a water-insoluble pale yellow oil.

Example 18

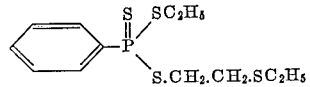

A mixture of 62 g. (0.5 mol) of β-ethylmercapto-ethylmercaptan, 400 cc. of toluene and 50 g. of pyridine is treated at 40° C. while passing through nitrogen with 103 g. (0.5 mol) of phenyl-phosphonous acid-S-ethyl ester chloride, the reaction mixture is subsequently heated at 40° C. for an hour, 16 g. of powdered sulphur are then added and the mixture is heated to 90° C. for a further hour. The mixture is then worked up as described in Example 1. 140 g. (96% of the theoretical) of phenyl-thionophosphonic acid-S-ethyl-S-(β-ethylmercapto-ethyl) ester are thus obtained in the form of a water-insoluble oil of B.P. 128° C./0.01 mm. Hg.

Example 19

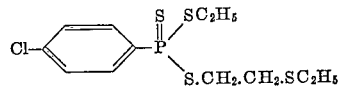

31 g. (0.25 mol) of β-ethylmercapto-ethyl-mercaptan are dissolved in 300 cc. of toluene with the addition of 25 g. of pyridine. To the resultant solution are added dropwise in a nitrogen stream at 40° C. 60 g. (0.25 mol) of 4-chlorophenyl-phosphonous acid-S-ethyl ester chloride, the mixture is subsequently heated at 40° C. for an hour and 8 g. of powdered sulphur are then added to the reaction mixture which is heated to 90° C. for a further hour, in order to complete the reaction, and then worked up as described in Example 1. Yield: 78 g. (76% of the theoretical) of 4-chlorophenyl-thionophosphonic acid-S-(β-ethylmercapto-ethyl) ester (water-insoluble oil).

Example 20

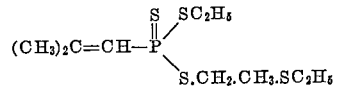

31 g. (0.25 mol) of β-ethylmercapto-ethyl-mercaptan are dissolved in a mixture of 300 cc. of toluene and 25 g. of pyridine, 46 g. (0.25 mol) of isobutenyl-phosphonous acid-S-ethyl ester chloride are added to this solution at 40° C. with stirring and passing through of nitrogen, the mixture is subsequently heated at 40° C. for an hour and then treated with 8 g. of powdered sulphur. The reaction mixture is subsequently heated to 90° C. for an hour and, finally, worked up as described in Example 1. 65 g. (97% of the theroretical) of isobutenyl-thionophosphonic acid-S-ethyl-S-(β-ethylmercapto-ethyl) ester are thus obtained as a water-soluble oil.

Example 21

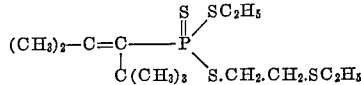

A mixture of 31 g. (0.25 mol) of β-ethylmercapto-ethyl mercaptan, 300 cc. of toluene and 25 g. of pyridine is treated at 40° C. with stirring and passing through of nitrogen with 60 g. (0.25 mol) of isooctenyl-phosphonous acid-S-ethyl ester chloride, the mixture is further heated at 40° C. for an hour and 8 g. of powdered sulphur are then added to the reaction mixture which is subsequently heated to 90° C. for a further hour and then worked up as described in Example 1. Yield: 73 g. (90% of the theoretical) of isooctenyl-thionophosphonic acid-S-ethyl-S-(β-ethylmercaptoethyl) ester as a yellow water-insoluble oil.

Example 22

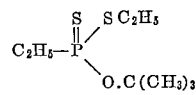

To a mixture of 38 g. (0.5 mol) of tert. butylalcohol, 400 cc. of benzene and 50 g. of pyridine are added at 30° C. with stirring and passing through of nitrogen 79 g. of ethyl-phosphonous acid-S-ethyl ester chloride (0.5 mol), the reaction mixture is stirred at 40° C. for an hour, then treated with 16 g. of finely powdered sulphur, further heated to 80° C. for an hour in order to complete the reaction, and worked up as described in Example 1. 95 g. (84% of the theoretical) of ethyl-thionophosphonic acid-S-ethyl-O-tert.butyl ester are thus obtained in the form of a water-insoluble colorless oil.

*Example 23*

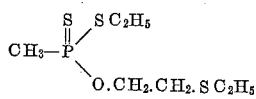

In an analogous manner to that described in the preceding examples 95 g. (78% of the theoretical) of methyl-thionophosphonic acid - S - ethyl-O-(β-ethyl-mercaptoethyl) ester of B.P. 86° C./0.01 mm. Hg are obtained from 53 g. of β-ethylmercapto-ethanol, 72 g. of methylphosphonous acid-S-ethyl ester chloride and 16 g. of sulphur.

*Example 24*

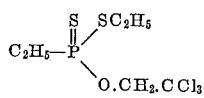

From 74 g. (0.5 mol) of trichlorethyl alcohol, 50 g. of pyridine, 79 g. of ethyl-phosphonous acid-S-ethyl ester chloride and 16 g. of sulphur there is obtained under analogous conditions the ethyl-thionophosphonic acid-S-ethyl-O-(trichloroethyl) ester of B.P. 72° C./0.01 mm. Hg. Yield: 122 g. corresponding to 81% of the theoretical.

*Example 25*

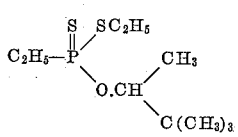

Under analogous reaction conditions to those of the preceding examples, 93 g. (73% of the theoretical) of ethyl-thionophosphonic acid-S-ethyl-O-(pinacolyl) ester of B.P. 68° C./0.01 mm. Hg. are obtained from 51 g. of pinacolyl alcohol, 50 g. of pyridine, 79 g. of ethyl-phosphonous acid-S-ethyl ester chloride and 16 g. of sulphur.

*Example 26*

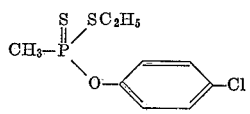

By reacting 64 g. of 4-chlorophenol, 72 g. of methyl-phosphonous acid-S-ethyl ester chloride (B.P. 45° C./1 mm. Hg) 50 g. of pyridine and 16 g. of sulphur under the conditions described in the preceding examples, there is obtained the methyl-thionophosphonic acid-S-ethyl-O-(4-chlorophenyl) ester of B.P. 110° C./0.01 mm. Hg in a yield of 109 g. (82% of the theoretical).

*Example 27*

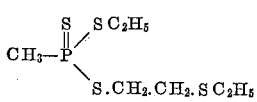

Under analogous reaction conditions to those of the preceding examples are there obtained from 61 g. of β-ethylmercapto-ethyl-mercaptan, 50 g. of pyridine, 72 g. of methyl-phosphonous acid-S-ethyl ester chloride and 16 g. of sulphur, 87 g. (67% of the theoretical) of methyl-thionophosphonic acid - S - ethyl-S-(β-ethylmercaptoethyl) ester of B.P. 98° C./0.01 mm. Hg.

*Example 28*

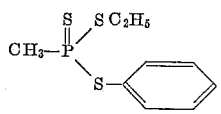

50 g. of pyridine are added to a solution of 55 g. (0.5 mol) of thiophenol in 400 cc. of benzene, subsequently 72 g. of methyl-phosphonous acid-S-ethyl ester chloride (B.P. 45° C./1 mm. Hg) are added dropwise at 30–40° C. with stirring and passing through of nitrogen, the reaction mixture is then further heated at 30° C. for an hour and then treated with 16 g. of sulphur. In order to complete the reaction, the mixture is further heated to 80° C. for an hour and then worked up as described in Example 1. 93 g. (75% of the theoretical) of methyl-thionophosphonic acid - S - ethyl-S-phenylester are thus obtained in the form of a pale yellow water-insoluble oil.

*Analysis.*—Calculated for molecular weight 248: S, 38.7%; P, 12.5%. Found: S, 39.5%; P, 12.4%.

*Example 29*

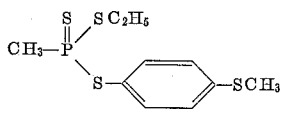

Under analogous conditions to those of the preceding examples there is obtained from 78 g. (0.5 mol) of 4-methylmercapto-thiophenol, 50 g. of pyridine, 72 g. (0.5 mol) of methyl-phosphonous acid-S-ethyl ester chloride and 16 g. of sulphur, the methyl-thionophosphonic acid-S-ethyl-S-(4-methylmercaptophenyl) ester as a pale yellow water-insoluble oil. Yield 115 g. corresponding to 78% of the theoretical.

*Analysis.*—Calculated for molecular weight 294: S, 43.6%; P, 10.5%. Found: S, 43.8%; P, 10.1%.

*Example 30*

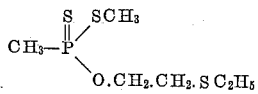

By reacting 53 g. (0.5 mol) of β-ethyl-mercapto-ethanol, 50 g. of pyridine, 65 g. of methyl-phosphonous acid-S-methyl ester chloride (B.P. 45° C./12 mm. Hg) and 16 g. of sulphur with one another under analogous conditions there are obtained 82 g. (71% of the theoretical) of methyl-thionophosphonic acid-S-methyl-O-(β-ethylmercaptoethyl) ester of B.P. 81° C./0.01 mm. Hg.

*Example 31*

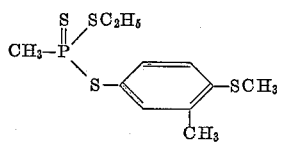

From 77 g. (0.5 mol) of 3-methyl-4-methylmercaptophenol, 50 g. of pyridine, 72 g. (0.5 mol) of methyl-phosphonous acid-S-ethyl ester chloride and 16 g. of sulphur there is obtained in an analogous manner the methyl-thionophosphonic acid-S-ethyl-O-(3-methyl-4-methylmercapto-phenyl) ester in the form of a water-insoluble yellow oil. Yield 135 g. (92% of the theoretical).

*Analysis.*—Calculated for molecular weight 292: S, 32.9%; P, 10.6%. Found: S, 32.9%; P, 10.1%.

Example 32

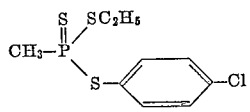

72 g. (0.5 mol) of 4-chlorophenyl-mercaptan are dissolved in 400 cc. of benzene. 50 g. of pyridine are added to this solution and 72 g. (0.5 mol) of methyl-phosphonous acid-S-ethyl ester chloride are then added dropwise at 30–40° C. in a nitrogen stream with stirring to the reaction mixture which is subsequently stirred for an hour and then treated with 16 g. of finely powdered sulphur. After further heating to 80° C. for an hour, the mixture is poured into 400 cc. of ice-water. The benzenic phase is washed with water until the reaction is neutral and then dried over sodium sulphate. Upon fractional distillation and after evaporation of the solvent, there are obtained 85 g. (60% of the theoretical) of methyl-thionophosphonic acid-S-ethyl-S-(4-chlorophenyl) ester of B.P. 112° C./0.01 mm. Hg.

Example 33

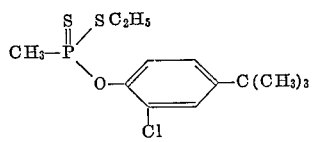

To a mixture of 92 g. (0.5 mol) of 2-chloro-4-tert. butylphenyl, 400 cc. of benzene and 50 g. of pyridine are added dropwise at 30–40° C. with stirring and passing though of nitrogen 72 g. (0.5 mol) of methyl-phosphonous acid-S-ethyl ester chloride, the mixture is subsequently heated for an hour and then treated with 16 g. of finely powdered sulphur. The reaction mixture is then further heated to 80° C. for an hour and worked up as described in the preceding example. After distilling off the solvent, there remain 105 g. (65% of the theoretical) of methyl-thionophosphonic acid - S-ethyl-O-(2-chloro-4-tert.butylphenyl) ester.

*Analysis.*—Calculated for molecular weight 323: S, 19.9%; Cl, 11.0%; P, 9.6%. Found: S, 21.0%; Cl, 10.2%; P, 9.7%.

Example 34

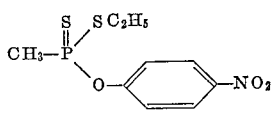

In an analogous manner there is obtained from 80 g. (0.5 mol) of sodium 4-nitrophenolate, 72 g. (0.5 mol) of methyl-phosphonous acid-S-ethyl ester chloride and 16 g. of sulphur, the methyl-thionophosphonic acid-S-ethyl-O-(4-nitrophenyl) ester as a yellow water-insoluble oil. Yield: 117 g. corresponding to 84% of the theoretical.

*Analysis.*—Calculated for molecular weight 277: P, 11.2%; S, 23.1%; N, 5.0%. Found: P, 11.15%; S, 23.3%; N, 4.9%.

Example 35

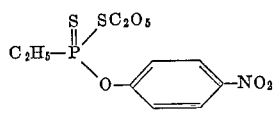

By reaction 80 g. of sodium 4-nitrophenolate, 79 g. (0.5 mol) of ethyl-phosphonous acid-S-ethyl ester chloride and 16 g. of sulphur under the reaction conditions described in the preceding examples, there are obtained 109 g. (75% of the theoretical of ethyl-thionophosphonic acid-S-ethyl-O-(4-nitrophenyl) ester in the form of a yellow water-insoluble oil.

*Analysis.*—Calculated for molecular weight 291: P, 10.7%; S, 22.0%; N, 4.8%. Found: P, 11.0%; S, 22.9%; N, 4.4%.

The following compounds can be produced under analogous conditions:

| Constitution | Boiling point in ° C./0.01 mm. Hg | Yield in percent of the theoretical |
|---|---|---|
| $CH_3-P(S)(SC_2H_5)(O-C_6H_4-SCH_3)$ | -------------- | 86 |
| $CH_3-P(S)(SC_2H_5)(S.CH_2.COOC_2H_5)$ | 82 | 68 |
| $CH_3-P(S)(SC_2H_5)(S-CH-CO-NHCH_3)$ | -------------- | 77 |
| $C_2H_5-P(S)(SC_2H_5)(O-C_6H_3Cl_2-Cl)$ | -------------- | 91 |
| $CH_3-P(S)(SC_2H_5)(O.CH(CH_3)(C(CH_3)_3))$ | 68 | 77 |
| $C_2H_5-P(S)(SCH_3)(O.CH_2.CH_2.SC_2H_5)$ | 86 | 80 |
| $CH_3-P(S)(SC_2H_5)(O-C_6H_2Cl_3)$ | -------------- | 93 |
| $CH_3-P(S)(SC_2H_5)(O-C_6H_4-Cl)$ | -------------- | 84 |
| $CH_3-P(S)(SC_2H_5)(O-C(CH_3)_3)$ | -------------- | 85 |

Example 36

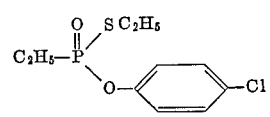

64 g. (0.5 mole) of 4-chlorophenol are dissolved in 400 cc. of benzene. 50 g. of anhydrous pyridine are added to the resultant solution, whilst nitrogen is passed through, and 79 g. of ethyl-phosphonous acid-S-ethyl ester chloride (B.P. 50° C./3 mm. of Hg) are then added at 30–35° C. dropwise to the reaction mixture, which is then heated at 30–35° C. for another hour, and is thereafter treated dropwise at about 30° C. with 50 g. of 36% of hydrogen peroxide. After the reaction has subsided, the mixture is stirred at 35° C. for another hour in order to complete the reaction, and it is then poured into 400 cc. of ice water. The benzene solution is separated, washed with water, and dried over sodium sulphate. After evaporation of the solvent, the subsequent fractionated distillation produces 95 g. (72% of the theoretical yield) of ethyl-phosphonic acid-S-ethyl-O-(4-chlorophenyl)-ester of B.P. 102° C./0.01 mm. of Hg.

Example 37

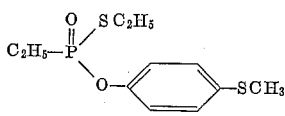

50 g. of pyridine are first added to a solution of 70 g. (0.5 mole) of 4-methyl-mercaptophenol in 400 cc. of benzene, and 79 g. of ethyl-phosphonous acid-S-ethyl ester chloride are thereafter added dropwise at 30° C. to the reaction mixture. The mixture is stirred at 30° C. for another hour, whilst nitrogen is passed through, in order to complete the reaction, and it is then treated at about 30° C. with 50 g. of 36% hydrogen peroxide. When the resulting, strongly exothermal reaction has subsided, the reaction mixture is stirred at 30° C. for another hour, and it is then worked up, as described in Example 36. By this method, 106 g. (77% of the theoretical yield) of ethyl-phosphonic acid-S-ethyl-O-(4-methylmercaptophenyl)-ester of B.P. 108° C./0.01 mm. of Hg are obtained.

Example 38

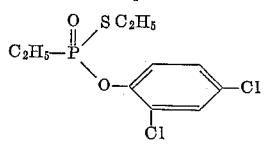

81 g. (0.5 mole) of 2,4-dichlorophenol are dissolved in 400 cc. of benzene, the solution is treated with 50 g. of anhydrous pyridine, and thereafter 79 g. of ethyl-phosphonous acid-S-ethyl ester chloride are added dropwise at 30° C. to the reaction mixture in a current of nitrogen, and this is stirred at 30° C. for one hour. Thereafter, 50 g. of 36% hydrogen peroxide are added dropwise at the stated temperature, the mixture is stirred for another hour at 30° C. after the strongly exothermal reaction has subsided, and it is then worked up as in Example 36. Yield 102 g. (68% of the theoretical) of ethyl - phosphonic acid - S - ethyl - O - (2,4 - dichlorophenyl)-ester. B.P. 114° C./0.01 mm. of Hg.

Example 39

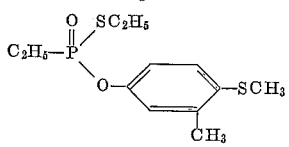

77 g. (0.5 mole) of 3-methyl-4-methylmercapto-phenol are dissolved in 400 cc. of benzene. 50 g. of anhydrous pyridine are added to this solution, and 79 g. of ethyl-phosphonous acid-S-ethyl ester chloride are added to the reaction mixture at 30° C., with stirring, whilst nitrogen is passed through; it is subsequently stirred at 30° C. for one hour and then treated at the stated temperature with 50 g. of 36% hydrogen peroxide. When the exothermal reaction has subsided, the mixture is stirred further at 35° C. for one hour, and it is then worked up as described in Example 36. There are obtained 112 g. of ethyl - phosphonic acid - S -ethyl - O - (3 - methyl - 4 - methyl-mercapto-phenyl)-ester in the form of a pale yellow oil insoluble in water.

Example 40

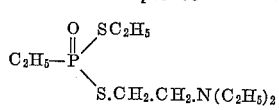

A solution of 68 g. (0.5 mole) of β-diethylamino-ethylmercaptan in 400 cc. of benzene is treated at 30° C. with 79 g. of ethyl-phosphonous acid-S-ethyl ester chloride, whilst nitrogen is passed through. The mixture is thereafter stirred at 40° C. for one hour, and 50 g. of 36% hydrogen peroxide are then added dropwise at 30° C. When the reaction has subsided, the reaction mixture is cooled to 0° C., and is then treated with a solution of 20 g. of sodium hydroxide in 50 cc. of water. The mixture is stirred for half an hour to complete the reaction, and the benzene layer is separated. The latter is dried with sodium sulphate and thereafter fractionally distilled. By this method, there are obtained 77 g. (57% of the theoretical yield) of ethyl-phosphonic acid-S-ethyl-S-(β-diethylamino-ethyl)-ester of B.P. 98° C./0.01 mm. of Hg.

Example 41

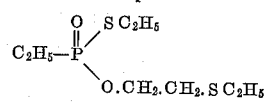

53 g. (0.5 mole) of β-ethylmercapto-ethanol are dissolved in 400 cc. of benzene. 50 g. of anhydrous pyridine are added to the solution whilst nitrogen is passed through, and 79 g. of ethyl-phosphonous acid-S-ethyl ester chloride are then added dropwise at 30° C., with stirring. Subsequently, the reaction mixture is warmed to 35° C. for one hour, and is then treated with 50 g. of 36% hydrogen peroxide at the stated temperature. When the exothermal reaction has subsided, the mixture is stirred at 35° C. for another hour and is then worked up as in Example 36. Yield 88 g. (73% of the theoretical) of ethyl - phosphonic acid - S - ethyl - O - (β - ethyl - mercaptoethyl)-ester of B.P. 83° C./0.01 mm. of Hg.

Example 42

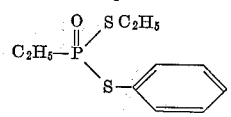

A solution of 55 g. (0.05 mole) of thiophenol in 400 cc. of benzene are treated with 50 g. of anhydrous pyridine, and 79 g. of ethyl-phosphonous acid-S-ethyl ester chloride are subsequently added dropwise to the reaction mixture, whilst stirring and passing nitrogen through it; it is thereafter heated to 30° C. for one hour and then treated with 50 g. of 36% hydrogen peroxide at the stated temperature. After the exothermal reaction has subsided, the mixture is stirred at 35° C. fo another hour, and it is then worked up as described in Example 36. 112 g. (91% of the theoretical yield) of ethyl-phosphonous acid-S-ethyl-S-phenyl ester are obtained by this method, in the form of a yellow oil insoluble in water.

Example 43

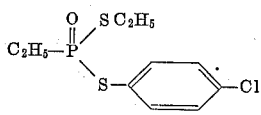

72 g. (0.5 mole) of 4-chlorophenyl-mercaptan are dissolved in 400 cc. of benzene. 50 g. of anyhdrous pyridine are added to the resultant solution, and thereafter 79 g. of ethyl-phosphonous acid-S-ethyl ester chloride are added dropwise at 30° C. whilst nitrogen is passed. To complete the reaction, the reaction mixture is stirred at 30° C. for another hour, and it is then treated with 50 g. of 36% hydrogen peroxide at the stated temperature. After the reaction has subsided, the mixture is stirred at 35° C. for another hour, and it is then worked up as described in Example 36. Yield 110 g. (78% of the theoretical) of ethyl-phosphonic acid-S-ethyl-S-(4-chlorophenyl) ester. A pale yellow oil insoluble in water.

Example 44

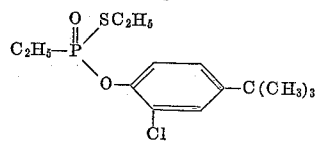

50 g. of anhydrous pyridine are added to a solution of 92 g. (0.5 mole) of 2-chloro-4-tert. butyl-phenol (B.P. 69° C./1 mm. of Hg) in 400 cc. of benzene, and 79 g. of ethyl-phosphonous acid-S-ethyl ester chloride are then added dropwise at 30–40° C. to the reaction mixture in a current of nitrogen. Subsequently, the mixture is treated at 30–35° C. with 50 g. of a 36% solution of hydrogen peroxide, with more stirring, it is stirred for another hour after the exothermal reaction has subsided, and is then worked up as described in Example 36. There are obtained 140 g. (87% of the theoretical yield) of ethyl-phosphonic acid-S-ethyl-O-(2-chloro-4-tert. butyl-phenyl)-ester in the form of a pale yellow oil insoluble in water.

*Example 45*

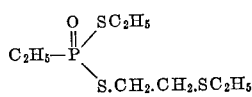

61 g. (0.5 mole) of β-ethylmercaptoethyl-mercaptan are dissolved in 400 cc. of benzene, 50 g. of pyridine are added to the resultant solution, 79 g. of ethyl-phosphonous acid-S-ethyl ester chloride are then added dropwise to the reaction mixture whilst stirring and passing nitrogen through, and it is then treated at 30–35° C. with 50 g. of a 36% solution of hydrogen peroxide with further stirring. After the strongly exothermal reaction has subsided, the mixture is stirred at 35° C. for yet another hour, and it is then worked up as described in Example 36. By this method, there are obtained 92 g. (72% of the theoretical yield) of ethyl-phosphonic acid-S-ethyl-S-(β-ethylmercaptoethyl)-ester of B.P. 96° C./0.01 mm. of Hg.

*Example 46*

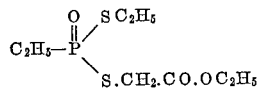

60 g. (0.5 mole) of thioglycollic acid ethyl ester are dissolved in 400 cc. of benzene. 50 g. of anhydrous pyridine are added to the resultant solution, and subsequently, 79 g. of ethyl-phosphonous acid-S-ethyl ester chloride are added dropwise at 40° C. to the reaction mixture whilst stirring and passing nitrogen through; it is warmed at 40° C. for another hour to complete the reaction, and is then treated at 30–35° C. with 50 g. of 36% hydrogen peroxide whilst stirring. After the exothermal reaction has subsided, the mixture is heated at 30° C. for another hour, and it is then worked up as in Example 36. Yield 83 g. (65% of the theoretical) of ethyl-phosphonic acid-S-ethyl-S-(ethoxycarbonylmethyl)-ester. B.P. 88° C./0.01 mm. of Hg.

*Example 47*

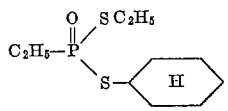

A mixture of 58 g. (0.5 mole) of cyclohexyl-mercaptan, 400 cc. of benzene, and 50 g. of pyridine is treated at 30–40° C. with 79 g. (0.5 mole) of ethyl-phosphonous acid-S-ethyl ester chloride, whilst stirring in a current of nitrogen. The reaction mixture is thereafter stirred at 35° C. for an hour, and 50 g. of 36% hydrogen peroxide is then added dropwise at 30 to 35° C. Thereafter, the mixture is heated at 35° C. for another hour, and then worked up as described in Example 36. There are obtained 100 g. (79% of the theoretical yield) of ethyl-phosphonic acid-S-ethyl-S-cyclohexyl ester of B.P. 84° C./0.01 mm. of Hg.

*Example 48*

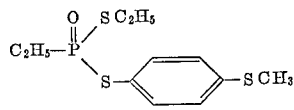

78 g. (0.5 mole) of 4-methylmercapto-thiophenol are dissolved in 400 cc. of benzene with an addition of 50 g. of pyridine. 79 g. (0.5 mole) of ethyl-phosphonous acid-S-ethyl ester chloride are added dropwise at 35° C. to this solution whilst nitrogen is passed through, the reaction mixture is subsequently warmed at 40° C. for one hour, and it is then treated dropwise at 30–35° C. with 50 g. of 36% hydrogen peroxide. To complete the reaction, the mixture is thereafter stirred at 35° C. for another hour, and then worked up as in Example 36. There are obtained 113 g. (77% of the theoretical yield) of ethyl-phosphonic acid-S-ethyl-S-(4-methylmercaptophenyl)-ester in the form of a yellow oil insoluble in water.

*Example 49*

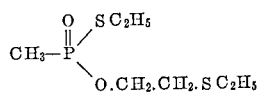

72 g. (0.5 mole) of methyl-phosphonous acid-S-ethyl ester chloride are added dropwise at 30° C. to a mixture of 53 g. (0.5 mole) of β-ethyl-mercaptoethanol, 400 cc. of benzene, and 50 g. of pyridine, whilst stirring in a current of nitrogen, the reaction mixture is thereafter heated at 40° C. for one hour, and 50 g. of 36% hydrogen peroxide are then added at 30–35° C., with stirring. To complete the reaction, the reaction mixture is heated at 35° C. for another hour, and it is then worked up as in Example 36. Yield 62 g. (55% of the theoretical) of methyl-phosphonic acid-S-ethyl-O-(β-ethyl-mercaptoethyl)-ester of B.P. 84° C./0.01 mm. of Hg.

*Example 50*

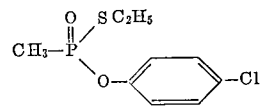

64 g. (0.5 mole) of 4-chlorophenol are dissolved in a mixture of 400 cc. of benzene and 50 g. of pyridine. 72 g. (0.5 mole) of methyl-phosphonous acid-S-ethyl ester chloride are added dropwise to the resultant solution, whilst stirring and passing nitrogen through, the reaction mixture is thereafter heated at 35° C. for another hour, and it is then treated at the stated temperature with 50 g. of 36% hydrogen peroxide, whilst stirring. In order to complete the reaction, the mixture is heated at 35° C. for an hour longer, and it is then worked up as described in Example 36. There are obtained 98 g. (78% of the theoretical yield) of methyl-phosphonic acid-S-ethyl-O-(4-chlorophenyl)-ester of B.P. 108° C./0.01 mm. of Hg.

*Example 51*

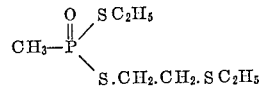

A mixture of 61 g. (0.5 mole) of β-ethylmercaptoethyl-mercaptan, 400 cc. of benzene, and 50 g. of pyridine are treated with 72 g. of methyl-phosphonous acid-S-ethyl ester chloride, whilst stirring and passing nitrogen through. To complete the reaction, the reaction mixture is subsequently stirred at 35° C. for another hour, and 50 g. of 36% hydrogen peroxide are then added dropwise at 30–35 C. Thereafter, the reaction mixture is heated at 35° C. for another hour, and it is then worked up as described in Example 36. There are obtained 87 g. (71% of the theoretical yield) of methyl-phosphonic acid- S-ethyl-S-(β-ethylmercaptoethyl)-ester of B.P. 96° C./0.01 mm. of Hg.

Example 52

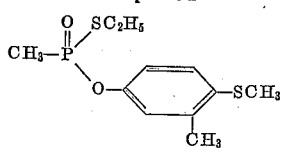

77 g. (0.5 mole) of 3-methyl-4-methylmercapto-phenol are dissolved in a mixture of 400 cc. of benzene and 50 g. of pyridine. 72 g. of methyl-phosphonous acid-S-ethyl ester chloride are added at 30–35° C. to this solution, whilst stirring and passing nitrogen through, the reaction mixture is thereafter heated at 35° C. for one hour, and 50 g. of 36% hydrogen peroxide are then added dropwise at 35° C. to the mixture, which, after having been heated at 35° C. for one hour, is then worked up according to the method described in Example 36. Yield 95 g. (69% of the theoretical) of methyl-phosphonic acid-S-ethyl-O-(3-methyl - 4 - methylmercaptophenyl)-ester of B.P. 112° C./0.01 mm. of Hg.

Example 53

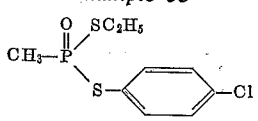

72 g. (0.5 mole) of 4-chlorophenyl-mercaptan are dissolved in 400 cc. of benzene. 50 g. of pyridine are added to the resultant solution, and 72 g. of methyl-phosphonous acid-S-ethyl ester chloride (B.P. 45° C./1 mm. of Hg) are thereafter added dropwise at 30° C., whilst nitrogen is passed through. The mixture is warmed 35° C. for one hour in order to complete the reaction, it is then treated at about 30° C. with 50 g. of 36% hydrogen peroxide whilst stirring again, it is stirred at 30° C. for another hour, and it is then worked up as described in Example 36. By this method, 70 g. (53% of the theoretical yield) of methyl-phosphonic acid-S-ethyl-S-(4-chlorophenyl)-ester of B.P. 113° C./0.01 mm. of Hg are obtained.

Example 54

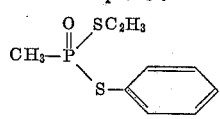

91 g. (78% of the theoretical yield) of methyl-phosphonic acid-S-ethyl-S-phenyl-ester of B.P. 98° C./0.01 mm. of Hg are obtained from 72 g. of methyl-phosphonous acid-S-ethyl ester chloride and 55 g. of thiophenol under the same conditions of reaction as described in the preceding examples.

Example 55

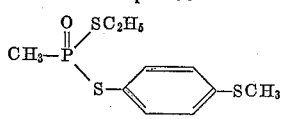

50 g. of anhydrous pyridine are added to a solution of 48 g. (0.5 mole) of 4-methylmercapto-thiophenol in 400 cc. of benzene, and 72 g. of methyl-phosphonous acid-S-ethyl ester chloride are then added at 30° C. to the reaction mixture, whilst stirring and passing nitrogen through; it is thereafter stirred at the stated temperature for one hour, and then treated at 30° C. with 50 g. of 36% hydrogen peroxide whilst stirring further. The mixture is heated at 30° C. for another hour in order to complete the reaction, and it is then worked up as in Example 36. There are obtained 112 g. (81% of the theroretical yield) of methyl-phosphonic acid-S-ethyl-S-(4-methyl-mercaptophenyl)-ester in the form of a yellow oil insoluble in water.

*Analysis.*—Calculated for molecular weight 278: S, 34.5%; P, 11.2%. Found: S, 34.6%; P, 11.2%.

Example 56

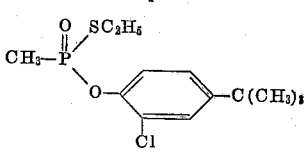

By a method analogous to the previous examples, 106 g. (89% of the theoretical yield) of methyl-phosphonic acid-S-ethyl-O-(2-chloro-4-tert. butyl-phenyl)-ester are obtained from 92 g. of 2-chloro-4-tert. butyl-phenol and 72 g. of methyl-phosphonous acid-S-ethyl ester chloride, in the form of a yellow oil insoluble in water.

Example 57

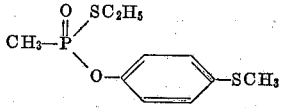

Methyl-phosphonic acid-S-ethyl-O-(4-methylmercaptophenyl)-ester is obtained from 70 g. of 4-methylmercaptophenol and 72 g. of methyl-phosphonous acid-S-ethyl ester chloride under analogous conditions. B.P. 105° C./0.01 mm. of Hg. Yield 96 g., corresponding to 73% of the theoretical.

Example 58

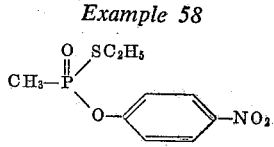

74 g. (57% of the theoretical yield) of methyl-phosphonic acid-S-ethyl-O-(4-nitrophenyl)-ester are obtained from 80 g. of sodium 4-nitrophenolate and 72 g. of methyl-phosphonous acid-S-ethyl ester chloride under analogous conditions of reaction, in the form of a yellow oil insoluble in water.

Example 59

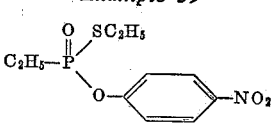

Ethyl-phosphonic acid-S-ethyl-O-(4-nitrophenyl)-ester is obtained in an analogous manner by reaction of 80 g. of sodium 4-nitrophenate and 79 g. of ethyl-phosphonous acid-S-ethyl ester chloride, in the form of a yellow oil insoluble in water. Yield 77 g. (56% of the theoretical).

Example 60

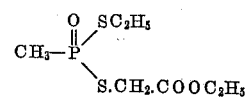

83 g. (69% of the theoretical yield) of methyl-phosphonic acid-S-ethyl-S-(carbethoxy-methyl)-ester of B.P. 82° C./0.01 mm. of Hg are obtained from 60 g. of thioglycollic acid ethyl ester and 72 g. of methyl-phosphonous acid-S-ethyl ester chloride.

Example 61

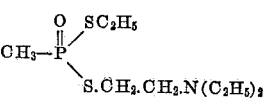

39 g. (31% of the theoretical yield) of methyl-phosphonic acid-S-ethyl-S-(β-diethylaminoethyl)-ester of B.P. 79° C./0.01 mm. of Hg are obtained in an analogous manner from 67 g. of β-diethylamino-mercaptan and 72 g. of methyl-phosphonous acid-S-ethyl ester chloride.

Example 62

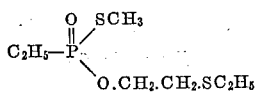

Ethyl-phosphonic acid-S-methyl-O-(β-ethylmercapto-ethyl)-ester of B.P. 84° C./0.01 mm. of Hg is obtained under analogous conditions of reaction from 53 g. of β-ethylmercapto-ethanol and 72 g. of ethyl-phosphonous acid-S-methyl ester chloride. Yield 67 g., corresponding to 59% of the theoretical.

Example 63

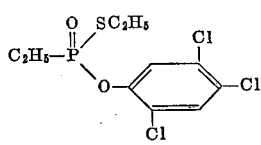

114 g. (68% of the theoretical yield) of ethyl-phosphonic acid-S-ethyl-O-(2,4,5-trichlorophenyl)-ester are obtained in the form of a yellow oil, insoluble in water, in an analogous manner by reaction of 99 g. of 2,4,5-trichlorophenol and 79 g. of ethyl-phosphonous acid-S-ethyl ester chloride.

Example 64

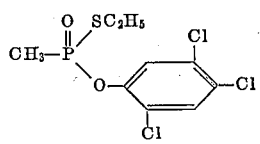

Methyl-phosphonic acid-S-ethyl-O-(2,4,5-trichlorophenyl)-ester is obtained by an analogous method from 99 g. of 2,4,5-trichlorophenol and 72 g. of methyl-phosphonous acid-S-ethyl ester chloride, in the form of a yellow oil, insoluble in water. Yield 92 g., corresponding to 57% of the theoretical.

Example 65

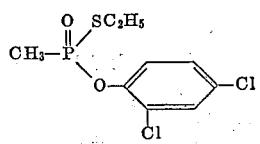

76 g. (53% of the theoretical yield) of methyl-phosphonic acid-S-ethyl-O-(2,4-dichlorophenyl)-ester are obtained in the form of a pale yellow oil, insoluble in water, under analogous conditions from 81 g. of 2,4-dichlorophenol and 72 g. of methyl-phosphonous acid-S-ethyl ester chloride.

I claim:
1. A compound of the formula

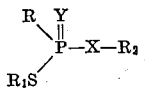

in which R stands for a member selected from the group consisting of alkyl having up to 12 carbon atoms, cycloalkyl, phenyl and chloro substituted phenyl; $R_1$ stands for lower alkyl having up to 4 carbon atoms; $R_2$ stands for a member selected from the group consisting of chloro-substituted alkyl, lower alkoxy carbonyl-substituted lower alkyl, cycloalkyl, phenyl, lower alkyl-substituted phenyl, chloro-substituted phenyl, lower alkyl mercapto-substituted phenyl, and nitro-substitutel phenyl, with the proviso that the alkyl in each case contains up to 4 carbon atoms; and X and Y stand independently for a chalkogen of an atomic weight less than 40.

2. A compound of claim 1 wherein X and Y are each oxygen.

3. A compound of claim 1 wherein X is sulfur and Y is oxygen.

4. A compound of claim 1 wherein X is oxygen and Y is sulfur.

5. A compound of claim 1 wherein X and Y are each sulfur.

6. A compound of claim 1 wherein R and $R_1$ are each lower alkyl and $R_2$ is lower alkyl mercapto-substituted phenyl.

7. A compound of claim 1 wherein R and $R_1$ are each lower alkyl and $R_2$ is a lower alkyl-chlorophenyl radical.

8. A compound of claim 1 wherein R and $R_1$ are each lower alkyl and $R_2$ is a nitrophenyl radical.

9. A compound of claim 1 wherein R and $R_1$ are each lower alkyl and $R_2$ is a chlorophenyl radical.

10. The compound of the following formula

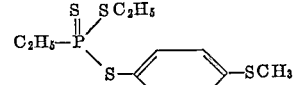

11. The compound of the following formula

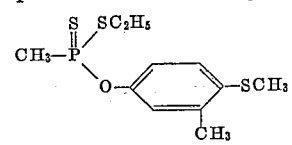

12. The compound of the following formula

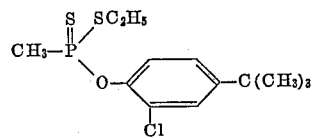

13. The compound of the following formula

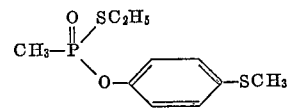

14. The compound of the following formula

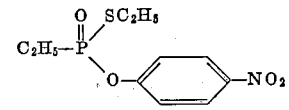

15. The compound of the following formula

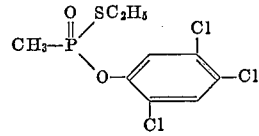

References Cited by the Examiner

UNITED STATES PATENTS

| | | | |
|---|---|---|---|
| 2,881,201 | 4/59 | Schrader | 260—461 |
| 2,916,509 | 12/59 | Schegk et al. | 260—461 |
| 2,967,884 | 1/61 | Dunn et al. | 260—461 |
| 3,056,825 | 10/62 | Schegk et al. | 260—461 |
| 3,113,005 | 12/63 | Gilbert | 260—461 |
| 2,121,662 | 2/64 | Schrader | 260—461 |

FOREIGN PATENTS

| | | |
|---|---|---|
| 221,534 | 6/62 | Australia. |
| 1,078,124 | 3/60 | Germany. |

OTHER REFERENCES

Metcalf et al.: "J. Econ. Entomol.," Volume 53, pages 127–130 (February, 1960).

Paikin et al.: "Chem. Abst.," Volume 52, columns 4096–4097 (1958).

CHARLES B. PARKER, *Primary Examiner.*

MORRIS LIEBMAN, IRVING MARCUS,

*Examiners.*